3,048,265
FOG RESISTANT POLYOLEFIN FILMS
Robert H. Hackhel, Berwyn, and William Sacks, Park Forest, Ill., assignors to Union Carbide Corporation, a corporation of New York
No Drawing. Filed Mar. 29, 1961, Ser. No. 99,042
21 Claims. (Cl. 206—45.34)

This invention relates to the prevention of fogging of thermoplastic film surfaces by condensed moisture, and more particularly relates to the prevention of moisture fogging on the surfaces of transparent, self-supporting polyolefin films employed in the packaging of moist food products.

Self-supporting polyolefin films, such as polyethylene film and polypropylene film, are characterized by high resistance to moisture vapor transmission. This property is of particular advantage in the packaging of moist foods with these films because the moisture content of the food is thereby substantially retained over long periods of time. Another desirable property of polyolefin films is their transparency, enabling easy visual identification of food products packaged in such films.

Qualitative evidence of polyolefin films' superior resistance to moisture vapor transmission is readily observed in the instance of fresh meats packaged in such films and stored in refrigerators maintained at temperatures above the freezing point of water. Often, within an hour after being packaged and stored, sufficient water evaporates from the meat surface to saturate the air spaces between the film and the meat, and then begins to condense on the inner surfaces of the polyolefin film as minute droplets of water. As more water droplets form on the inner polyolefin surfaces, an overall fogged effect is produced, interfering with visual identification of the meat or other packaged commodity.

Accordingly, it is an object of the present invention to impart to surfaces of thermoplastic materials resistance to moisture fogging.

A further object is to impart to self-supporting polyolefin films resistance to moisture fogging.

A further object is to provide melt-extrudable polyolefin compositions, heat-formable into clear, self-supporting films, and particularly characterized by their resistance to surface fogging by humid atmosphere.

A further object is the production of clear, self-supporting films coated with an agent imparting to the film resistance to surface fogging by humid atmosphere.

The accomplishment of these objectives and others as will become apparent is hereinafter described.

It has been found that the association of an amine or amide containing at least one ethylene oxide group which has the formula:

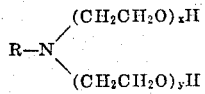

wherein the sum of $x$ and $y$ has a value from 2 to 5 inclusive, and R is an acyl radical derived from a fat-forming fatty acid having from 12 to 22 carbon atoms inclusive, or a monovalent aliphatic radical having from 12 to 22 carbon atoms inclusive, with a thermoplastic material and preferably a polyolefin material is unexpectedly effective in causing moisture condensing on the surfaces of such material to coalesce into a continuous visually clear film instead of forming a fogged surface comprising individual droplets of water.

The term "anti-fog agent" as herein used means the above identified amines or amides containing at least one ethylene oxide group as well as mixtures of said amines or amides and one or more compounds for preventing moisture fogging of polyolefin film surfaces, such as the monoglycerols of fat-forming fatty acids set forth in copending patent application, Serial No. 99,056; sorbitan esters of fat-forming fatty acids set forth in copending patent application, Serial No. 99,057; the ethylene oxide or polyoxyethylene ethers or esters set forth in copending patent application, Serial No. 99,058; and the ethylene oxide or polyoxyethylene sorbitan esters of fat-forming fatty acids, set forth in copending patent application, Serial No. 99,038; all of said copending applications being filed simultaneously herewith. Thus the anti-fog agent in association with the polyolefin can include ethylene oxide or polyoxyethylene amines or amides as well as mixtures of said ethylene oxide and nitrogen containing compounds and the compounds set forth in the above-identified copending patent application. Moreover it is preferred that said mixtures as herein defined have an HLB value from about 4 to 14 inclusive.

Anti-fog agents having an HLB value of less than about 4 and more than 14 do not impart optimum anti-fog properties to the film. Also, mixtures of compounds wherein the HLB value of each constituent is outside the specified range and the HLB value of said mixture is within the specified range, do not give desirable anti-fog properties to the film.

The term "HLB," as used herein is defined in the Journal of the Society of Cosmetic Chemists of 1949, pages 311 through 326; and the Journal of the Society of Cosmetic Chemists of 1954, pages 249 through 256. Briefly, the term "HLB" comes from the words "hydrophile-lipophile balance." The "HLB" method as described in the Journal of the Society of Cosmetic Chemists is a method which assigns numerical values to surfactants thereby providing a system of classification that is related to their behavior and to their solubility in water. The "HLB" method is based on the premise that all surfactants combined hydrophilic and lipophilic groups in one molecule and that the proportion between the weight percentages of these two groups for non-ionic surfactants is an indication of the behavior that may be expected from the product.

The term fat-forming fatty acids as herein used is definitive of those fatty acids present as such or as glycerides in natural fats. The Yearbook of Agriculture, 1959 Food, U.S. Department of Agriculture, page 716, defines "fat" as follows:

A glyceryl ester of fatty acids. Fats generally are substances of plant and animal origin. Fat may be in solid form, as butter, margarine, or other shortening, or in liquid form, as the vegetable oils.

The fat-forming fatty acids useful in the practice of this invention can be prepared by known procedures, as for example by the glycerolysis of natural fats or oils, these being essentially mixtures of various fatty acid triglycerides. Upon glycerolysis of such oils or fats, there is usually obtained a complex mixture including free fatty acids. The components of such mixtures can be separated by suitable distillation procedures.

Illustrative examples of fat-forming fatty acids effective for the purposes of this invention are those obtained by the hydrolysis of such fats or oils as beef tallow, mutton tallow, butter fat, coconut oil, corn oil, cotton seed oil, lard oil, olive oil, peanut oil, soy bean oil and sesame oil.

Illustrative of nitrogen containing compounds useful in the practice of this invention include monovalent aliphatic alkyl or alkenyl amines having from 12 to 22 carbon atoms inclusive such as lauryl amine, oleyl amine, stearyl amine and benhenyl amine as well as the corresponding amides having from 12 to 22 carbon atoms inclusive, such as lauryl amide, oleyl amine, stearyl amide and benhenyl amide.

The anti-fog agents of the present invention can be prepared by known procedures as for example reacting the selected amine or amide with the desired units of ethylene oxide. Illustrative amines and amides thusly formed are set forth in Table I.

TABLE I

| Anti-fog agent: | Units of ethylene oxide (sum of $x$ and $y$) |
|---|---|
| Polyoxyethylene lauryl amine | 2 |
| Polyoxyethylene lauryl amine | 3 |
| Polyoxyethylene coco amine | 5 |
| Polyoxyethylene soybean amine | 2 |
| Polyoxyethylene stearyl amine | 2 |
| Polyoxyethylene behenyl amine | 2 |
| Polyoxyethylene behenyl amine | 5 |
| Polyoxyethylene lauryl amide | 2 |
| Polyoxyethylene lauryl amide | 5 |
| Polyoxyethylene behenyl amide | 2 |
| Polyoxyethylene behenyl amide | 5 |
| Polyoxyethylene coco amide | 5 |

The association of an anti-fog agent of the present invention with thermoplastic materials and preferably polyolefin materials to impart thereto resistance to moisture fogging can be effected in several ways. One satisfactory method is to coat the surface of the material with an anti-fog agent, as for example by dispersing or dissolving a selected ethylene oxide or polyoxyethylene amine or amides in a volatile solvent therefor, such as methyl alcohol, methyl ethyl ketone, acetone, and the like, coating the polyolefin surface therewith and then permitting the solvent to evaporate.

In a preferred embodiment, the anti-fog agent is homogeneously incorporated into the polyolefin material, as for example by heating them together to at least the melting point of the plastic material in a suitable mixing apparatus, such as a Banbury mixer or heated differential mixing rolls until a homogeneous mixture is formed, solidifying the mixture by cooling and then comminuting the cooled mixture to a particle size satisfactory for hot-melt extrusion or equivalent heat-shaping operation to form films, molded objects, and the like.

Film-forming polyolefins suitable for the present invention are particularly exemplified by low density polyethylene having a density from at least a film-forming grade to 0.935 gram per cubic centimeter at 25° C.; high densitiy polyethylene of more than 0.935 gram per cubic centimeter at 25° C. and preferably from 0.94 to 0.98 gram per cubic centimeter at 25° C.; polypropylene having a density of at least about 0.88 gram per cubic centimeter at 25° C.; copolymers of ethylene and propylene; and polymers obtained from ethylene or propylene copolymerized with minimal amounts of ether mono-olefinic monomers such as butene, isobutylene, acrylic acids, esters of acrylic acids, styrene or combinations thereof such that the melting point of the final copolymer is not more than 10° C. different from the corresponding low density polyethylene homopolymer; or such that the crystallinity of the corresponding high density polyethylene or polypropylene homopolymer is not significantly lessened.

The anti-fog agent of the present invention is associated with the above-described film-forming polyolefins in an amount which imparts fog resistance to the film and not more than that which does not appear to further improve the anti-fog properties of the film and/or not more than that which adversely affects the other normally desired physical characteristics of the polyolefin films produced therefrom. As for example, it has been found that if an excess amount of anti-fog agent is incorporated in the polyolefin film, it tends to be tacky and has a greasy feel. The blocking and slip properties of the film are also adversely affected. Moreover, an excess of anti-fog agent in the film adversely affects the adhesive of inks thereto.

Thus, to produce about a 1 mil thick fog-resistant low density polyethylene film without adversely affecting its other normally desired properties, the anti-fog agent is added in amounts from about 0.05 percent to 1.0 percent by weight of the polyethylene and preferably from about 0.1 percent to 0.75 percent by weight of the polyethylene. Incorporation of less than about 0.05 percent by weight of the anti-fog agent into the polyethylene does not result in any appreciable improvement in the anti-fog properties of the films produced from those compositions. Incorporation of more than about 1.0 percent by weight of the anti-fog agent into the polyethylene does not appear to further improve the anti-fog properties of the films produced therefrom. In addition, the resultant film has a tendency to be tacky, and the feel, slip, blocking and ink adhesion properties of said film are adversely affected when more than about 1.0 percent by weight of the anti-fog agent is incorporated therein.

To impart fog-resistance to a 1 mil thick high density polyethylene film or polypropylene film without adversely affecting the other normally desired properties of the films from about 0.5 percent to 4.0 percent by weight of polyolefin and preferably from about 0.5 percent to 2.5 percent by weight of polyolefin of anti-fog agent can be incorporated into the high density polyethylene or polypropylene.

Optimumly, the concentration of the anti-fog agent in the film will vary with the thickness of the film. Since thinner films have a greater surface area per unit weight of film than do thicker films, a greater concentration of the anti-fog agent will be necessary to produce optimum results in thinner films than that necessary for thicker films. As an example of this, 0.1 to 0.2 percent by weight of polyethylene of the anti-fog agent in 1.5 mil low density polyethylene film produces excellent anti-fog characteristics, while 0.2 to 0.3 percent by weight of polyethylene of said anti-fog agent in 0.75 mil thick low density polyethylene film produces the same excellent results. The optimum concentration for each particular thickness of the film can be readily determined by simple empirical tests.

The normally added materials, such as fillers, stabilizers, plasticizers, colorants, slip agents, anti-blocking agents, anti-static, antioxidant and the like can be added to the compositions of this invention, provided, however, they are present in minimal amounts which will not offset the anti-fog characteristic improvements in these compositions.

Anti-fog compositions of this invention can be extruded into self-sustaining films or can be coated onto base films by any of the methods known to the art. Preferably, however, when seamless tubing is desired, the compositions are extruded by the blown-tube method disclosed in U.S. Patent 2,461,975 to Fuller and U.S. Patent 2,461,976 to Schenk. These methods comprise, in general, melt extruding the thermoplastic composition through an annular die in the form of a seamless tubing, drawing the tubing from the die, and thereafter cooling, flattening and winding the tubing on reels. A bubble of a gaseous medium is maintained within the tubing between the annular die and the flattening means to distend the tubing to the desired diameter. Sheeting can be made from the tubing by cutting either one or both of the longitudinal edges.

The resulting fog-resistant polyolefin films are transparent and can be biaxially oriented by any methods known to the art. Also, these films printed satisfactorily after suitable treatment of said film by methods known in the art, such as by subjecting the film to the action of corona discharge, flame treatment, chlorination, etc. Furthermore, such films can be heat sealed.

The following examples serve to further illustrate the invention, but are not to be construed in limitation thereof.

*Examples 1–6*

Polyethylene having a melt index of 2.0 and a density of 0.921 gram per cubic centimeter at 25° C. was placed on a differential two roll mill having a roll temperature of about 250° F. The ratio of the roll speeds was approximately 1.4 to 1 with the slower roll turning at about 20 r.p.m. The polyolefin was heated until softened and a commercial polyoxyethylene alkyl or alkenyl amine set forth in Table II in the specified concentration was added thereto. The polyethylene and polyoxyethylene amine were milled together on the heated differential two roll mill for approximately 30 minutes until a homogeneous mixture was obtained. The composition was removed from the mill, cooled, and cut to suitable particle size for melt extrusion. Each composition was then formed into film having a thickness set forth in Table II by the blown-tube method set forth in U.S. Patent 2,461,975. The tubular film was slit to form sheeting and the anti-fog properties determined as outlined below.

*Examples 7–9*

The procedure set forth in Examples 1–6 except that polyoxyethylene amides set forth in Table II in the amounts specified were used as the anti-fog agent. The anti-fog properties of the resultant films were also determined as set forth below. The results are recorded in Table II.

Similarly the incorporation of specific amounts of anti-fog agents as herein described in high density polyethylene and polypropylene imparts fog-resistant properties made from such compositions. Moreover the coating of polyolefin films with anti-fog agents as herein described also imparts resistant properties to the coated polyolefin film.

As a control, the same polyethylene used in preparing these film compositions, but without an anti-fog agent, was melt extruded into film by the same method. Comparative fogging tendencies were determined as outlined below with the results being recorded in Table II.

The test used to determine the anti-fog properties of the film was as follows. A 250 ml. beaker was filled to within ½ inch of the top with water at 120° F. A 4″ x 4″ piece of film was quickly fastened over the mouth of the beaker with a rubberband. Observations were made periodically as to the nature of the water condensation on the inner surface of the film. The results are recorded in Table II.

TABLE II

| Example | Anti-fog agent | Units of ethylene oxide (Value of $x$ plus $y$) | Concentration[1] of anti-fog agent in polyolefin | Film Thickness, mils | Time required for water vapor to coalesce into clear visual film at film surface |
|---|---|---|---|---|---|
| 1 | polyoxyethylene stearyl amine. | 2 | 0.25 | 2.0 | 15–60 minutes. |
| 2 | do | 2 | 0.4 | 2.0 | 15–60 minutes. |
| 3 | polyoxyethylene coco amine. | 5 | 0.25 | 2.0 | 1–2 hours. |
| 4 | do | 5 | 0.4 | 2.0 | 1–2 hours. |
| 5 | polyoxyethylene soybean amine. | 2 | 0.25 | 2.0 | immediate. |
| 6 | do | 2 | 0.4 | 2.0 | Do. |
| 7 | polyoxyethylene lauryl amide. | 5 | 0.4 | 2.0 | 5–60 minutes. |
| 8 | polyoxyethylene coco amide. | 5 | 0.1 | 1.5 | 2 hours. |
| 9 | do | 5 | 0.5 | 1.5 | immediate. |
| Control | None | | | 2.0 | (²) |

[1] Concentration of anti-fog agent in polyolefin as expressed in percent by weight of polyethylene.
[2] Water vapor at the film surface did not coalesce but remained in the form of extremely fine to small droplets such that the film was opaque to translucent after 24 hours of exposure.

Thus, the foregoing clearly shows that the association of anti-fog agents herein described with polyolefins imparts fog resistance properties to the film made from such compositions.

In addition to imparting fog resistance to polyolefin films, the anti-fog agents herein described do not adversely affect the transparency of such films. Accordingly, the polyolefin films make them admirably suited for packaging or containing fresh meats, vegetables, flowers and other moisture-emitting products without interfering with visual identification of the packaged commodity because the polyolefin film is transparent and because water droplets condensing on the inside of the polyolefin packaging material will be coalesced into a clear visual film.

As described herein, the invention is of special utility in improving the resistance to fogging of self-supporting polyolefin films as particularly exemplified by polyethylene and polypropylene. It will be appreciated by those skilled in the art that the principles of this invention may be applicable to other films, as for example cellulose acetate film, films of rigid and plasticized vinyl chloride polymer or copolymer, or vinylidene chloride polymers or copolymers, polyamide films, and polyethylene terephthalate film. Moreover, the improved surfaces are not restricted to film surfaces, but are extendable to rigid solid surfaces, such as molded or cast objects, as exemplified by plastic bottles and plastic windshields, particularly those comprising polymerized methyl methacrylate.

The anti-fog agents as herein described and contemplated can also be incorporated into a coating composition and the coating composition applied to a base surface; as for example, incorporating the anti-fog agent into a polyethylene coating composition and melt extruding the coating compositions onto a regenerated cellulose substrate film by methods known to those in the art.

It will be obvious to those skilled in the art that various other changes can be made without departing from the spirit and scope of the present invention.

What is claimed is:

1. Composition of matter having at least one surface resistant to fogging on exposure to a humid atmosphere comprising a thermoplastic material and an anti-fog agent including a member having the formula:

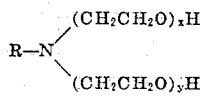

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount imparting resistance to moisture fogging.

2. A film-forming composition comprising a homogeneous mixture of a thermoplastic material and an anti-fog agent including a member having the formula:

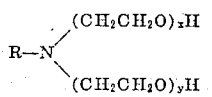

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount imparting resistance to moisture fogging and less than that imparting tackiness to a polyolefin film formed from said composition.

3. A film-forming composition comprising a homogeneous mixture of a polyolefin material, and an anti-fog agent having the formula:

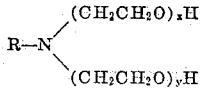

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said member being present in an amount imparting resistance to moisture-fogging and not more than that imparting tackiness to a film formed from said composition.

4. The film-forming composition according to claim 3, wherein said anti-fog agent is polyoxyethylene stearyl amine.

5. The film-forming composition according to claim 3, wherein said anti-fog agent is polyoxyethylene coco amine.

6. The film-forming composition according to claim 3, wherein said anti-fog agent is polyoxyethylene soybean amine.

7. The film-forming composition according to claim 3, wherein said anti-fog agent is polyoxyethylene lauryl amide.

8. The film-forming composition according to claim 3, wherein said anti-fog agent is polyoxyethylene coco amide.

9. A film-forming composition comprising a homogeneous mixture of a polyolefin material selected from the group consisting of low density polyethylene, high density polyethylene and polypropylene, and an anti-fog agent including a member having the formula:

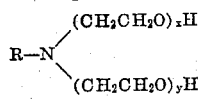

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said member being present in an amount imparting resistance to moisture fogging and not more than about 1.0 percent by weight of polyolefin in the instance of low density polyethylene and not more than about 4.0 percent by weight of polyolefin in the instance of high density polyethylene and polypropylene.

10. A thermoplastic film having at least one surface resistant to fogging on exposure to a humid atmosphere, said polyolefin film containing an anti-fog agent including a member having the formula:

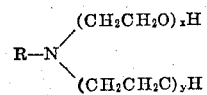

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount imparting resistance to moisture fogging.

11. A transparent polyolefin film resistant to fogging upon exposure to a humid atmosphere, said film having homogeneously dispersed therein an anti-fog agent including a member having the formula:

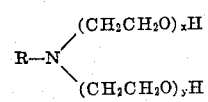

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said member being present in an amount imparting resistance to moisture fogging and less than that imparting tackiness to said film.

12. A transparent, self-supporting low density polyethylene film resistant to fogging upon exposure to a humid atmosphere, having homogeneously dispersed therein an anti-fog agent having the formula:

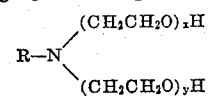

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said member being present in an amount imparting resistance to moisture fogging and not more than about 1.0 percent by weight of polyolefin.

13. A transparent, self-supporting polyolefin film resistant to fogging upon exposure to a humid atmosphere wherein said polyolefin is selected from the group consisting of polyethylene having a density of more than 0.935 and polypropylene, said film having homogeneously dispersed therein an anti-fog agent having the formula:

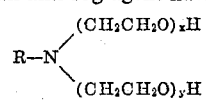

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said member being present in an amount imparting resistance to moisture fogging and not more than about 4.0 percent by weight of polyolefin.

14. A package which contains a water emitting material and is formed of a thermoplastic wrapping film containing an anti-fog agent having the formula:

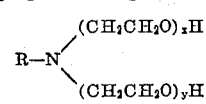

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount imparting resistance to moisture fogging to at least the film surface exposed to the water emitting material.

15. A package which contains a water emitting material and is formed of a polyolefin wrapping film having homogeneously dispersed therein an anti-fog agent having the formula:

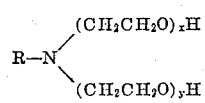

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount imparting to said polyolefin film resistance to moisture fogging.

16. A package which contains a water emitting material and is formed of a polyolefin wrapping film selected from the group consisting of low density polyethylene, high density polyethylene and polypropylene, and having homogeneously dispersed therein an anti-fog agent imparting to said film resistance to moisture fogging having the formula:

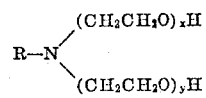

wherein the sum of $x$ and $y$ has a value from 2 to 5 inclusive, and R is a member selected from the group consisting of an acyl radical derived from a fat-forming fatty acid having from 12 to 22 carbon atoms inclusive and a monovalent aliphatic radical having from 12 to 22 carbon atoms inclusive, said anti-fog agent being present in an amount from about 0.05 percent to 1.0 percent by weight of polyolefin in the instance of low density polyethylene and from about 0.5 to 4.0 percent in the instance of high density polyethylene and polypropylene.

17. The package according to claim 16, wherein said anti-fog agent is polyoxyethylene stearyl amine.

18. The package according to claim 16, wherein said anti-fog agent is polyoxyethylene coco amine.

19. The pacakage according to claim 16, wherein said anti-fog agent is polyoxyethylene soybean amine.

20. The package according to claim 16, wherein said anti-fog agent is polyoxyethylene lauryl amide.

21. The package according to claim 16, wherein said anti-fog agent is polyoxyethylene coco amide.

No references cited.